United States Patent
Schulz

(10) Patent No.: US 7,085,374 B2
(45) Date of Patent: Aug. 1, 2006

(54) DISTRIBUTED ECHO CANCELLING

(75) Inventor: Dieter Schulz, Dunrobin Shores (CA)

(73) Assignee: Zarlink Semiconductor Inc. (CA)

( * ) Notice: Subject to any disclaimer, the term of this patent is extended or adjusted under 35 U.S.C. 154(b) by 0 days.

(21) Appl. No.: 10/447,857

(22) Filed: May 29, 2003

(65) Prior Publication Data

US 2003/0223574 A1   Dec. 4, 2003

(30) Foreign Application Priority Data

May 31, 2002   (GB)   .................................. 0212591.2

(51) Int. Cl.
*H04M 9/08*   (2006.01)

(52) U.S. Cl. ................. 379/406.01; 379/406.02; 379/406.05; 379/406.06; 379/406.08; 379/406.11; 370/286; 370/289; 455/570; 455/569.1

(58) Field of Classification Search ........ 379/406.01–406.16; 370/286–292
See application file for complete search history.

(56) References Cited

U.S. PATENT DOCUMENTS

| 5,875,246 | A | 2/1999 | Houghton |
| 6,081,732 | A | 6/2000 | Suvanen et al. |
| 6,434,235 | B1 * | 8/2002 | Minkoff ................ 379/406.08 |
| 6,570,985 | B1 * | 5/2003 | Romesburg ........... 379/406.08 |
| 6,574,336 | B1 * | 6/2003 | Kirla .................... 379/406.01 |
| 6,724,736 | B1 * | 4/2004 | Azriel .................... 370/286 |
| 6,745,018 | B1 * | 6/2004 | Zehavi et al. ............. 455/296 |

FOREIGN PATENT DOCUMENTS

| EP | WO 9642142 A1 * | 12/1996 |
| GB | 2316282 | 2/1998 |
| WO | WO 98/19441 | 5/1998 |

* cited by examiner

*Primary Examiner*—Sinh Tran
*Assistant Examiner*—Ramnandan Singh
(74) *Attorney, Agent, or Firm*—Jones Day

(57) ABSTRACT

A distributed echo cancelling architecture is provided where echo-cancelling functions are performed at locations remote from devices receiving signals with echoes. The echo cancelling functions use a reference signal, which has been corrupted with the echoes at the devices, for echo cancellation. As echo canceller resources are located at a central system and not at each individual device, the echo canceller resources can therefore be shared between the devices.

4 Claims, 6 Drawing Sheets

Distributed Echo Canceller 800

DISTRIBUTED ECHO CANCELLING

FIELD OF THE INVENTION

This invention relates to echo cancelling and in particular to distributed echo cancelling.

BACKGROUND OF THE INVENTION

The purpose of echo cancelling is to compensate a signal for echoes caused by various sources including feedback from a speaker in close proximity to a microphone. In general, prior art echo cancellers use a reference signal to determine the echoes and accordingly compensate the signal by removing (subtracting) an estimate of the echoes from the signal.

However, echo cancelling, either acoustic or line, can be relatively expensive, especially in long delay networks, such as packet-based networks. In traditional echo canceller architecture, the delays in the network are compensated by increasing buffer size and thus memory requirements. Unreliable transport media, such as Internet Protocol networks, have an additional problem of packet loss, which can considerably reduce the effectiveness of an echo canceller.

Referring to FIG. 1, there is shown a block diagram of a conventional echo canceller 100. The conventional echo canceller 100 comprises an echo estimator and control 110 and a subtractor 120. An input signal (Sin 130) is a combination of an Echo 132 (the echoes) and the near end signal. As is known in the art, the echo estimator and control 110 uses the reference signal (Rout or Rin) 134 and the subtractor 120 to remove an estimate of the echo from the input signal 130. The goal of the echo canceller is to create an output signal (Sout 136) that matches the near end signal as closely as possible with the echo sufficiently reduced.

Referring to FIG. 2, there is shown a block diagram of a conventional full duplex hands free (FDHF) echo canceller 200 for a traditional speakerphone. The FDHF echo canceller 200 includes a line echo estimator and control 210 as well as a first subtractor 215 for cancelling line echo 217 (the echoes) introduced by a network (not shown). An acoustic echo estimator is provided along with control 220 and a second subtractor 222 for cancelling acoustic echo 224 between loudspeaker 226 and microphone 228.

Referring to FIG. 3, there is shown a block diagram of a conventional packet network based acoustic echo canceller 300 for connection with a packet network 350. In packet networks, line echo is typically cancelled at IP/PSTN gateways (not shown). The canceller 300 comprises an acoustic echo estimator 300, a subtractor 310, a packetizer 320 and de-packetizer 330.

In the traditional speakerphone, these echo-cancelling resources are located on the phone, which increases the cost for each of the phone sets. These echo-cancelling resources are usually idle, since for most of the time, users are not using the speakerphone feature.

It is therefore desirable to provide an echo cancelling system, which addresses the shortcomings of providing echo cancelling, noted above.

SUMMARY OF THE INVENTION

A distributed echo cancelling architecture is provided where echo-canceling functions are performed at locations remote from devices receiving signals with echoes. The echo cancelling functions use the input (transmit) signal, which has been corrupted with the echoes at the devices, along with a copy of the reference signal as received at the devices, for echo cancellation. As echo canceller resources are located at a central system and not at each individual device, the echo canceller resources can be shared between the devices.

It is an aspect of an object of the present invention to reduce the overall cost of a communications system.

It is a further aspect of an object of the present invention to provide echo cancellers that are independent of network delay and more robust towards packet/frame loss than prior art echo cancellers.

According to an aspect of the invention, there is provided a communication system, comprising a system having an echo cancelling function for cancelling echoes from at least one signal using a first reference signal; and at least one device that is remote from the system over a network for receiving a second reference signal comprising the first reference signal as modified by network effects due to transmission over the network, for initiating incorporation of the echoes into the second reference signal to form a part of respective one of said at least one signal, and for receiving and transmitting said at least one signal to the system over the network.

According to a further aspect of the invention, there is provided A method of distributed echo cancelling in a communication system, comprising transmitting a first reference signal to at least one device that is remote over a network; receiving a second reference signal by said at least one device where the second reference signal comprises the first reference signal as modified by network effects due to transmission over the network; initiating incorporation of echoes at said at least one device into the second reference signal to form a part of at least one signal where said at least one signal also has the echoes; receiving said at least one signal over the network; and cancelling the echoes from said at least one signal using the first reference signal.

BRIEF DESCRIPTION OF THE DRAWINGS

The present invention will be described in detail with reference to the accompanying drawings, in which like numerals denote like parts, and in which.

DETAILED DESCRIPTION OF THE PREFERRED EMBODIMENTS

Figure 1:
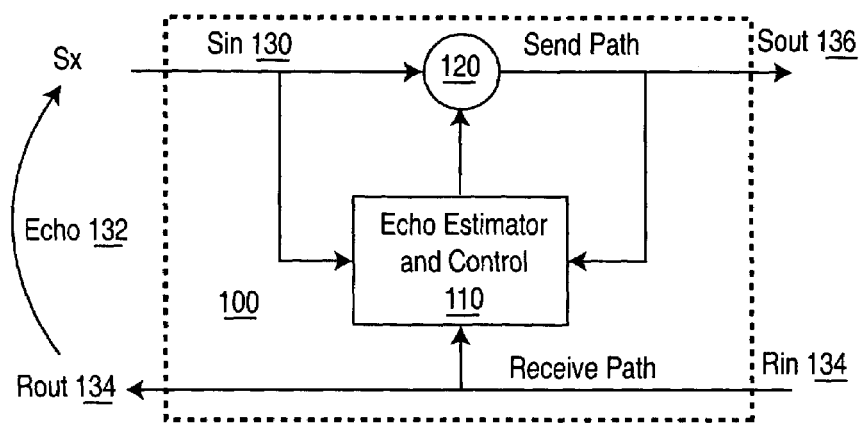
FIG. 1 is a block diagram of a conventional echo canceller.
Figure 2:
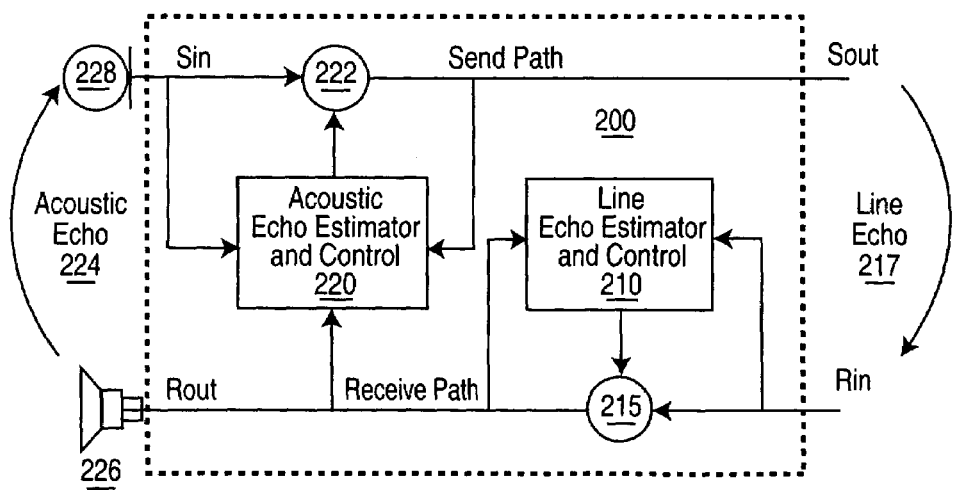
FIG. 2 is a block diagram of a conventional full duplex hands free (FDHF) echo canceller for a traditional speakerphone.
Figure 3:
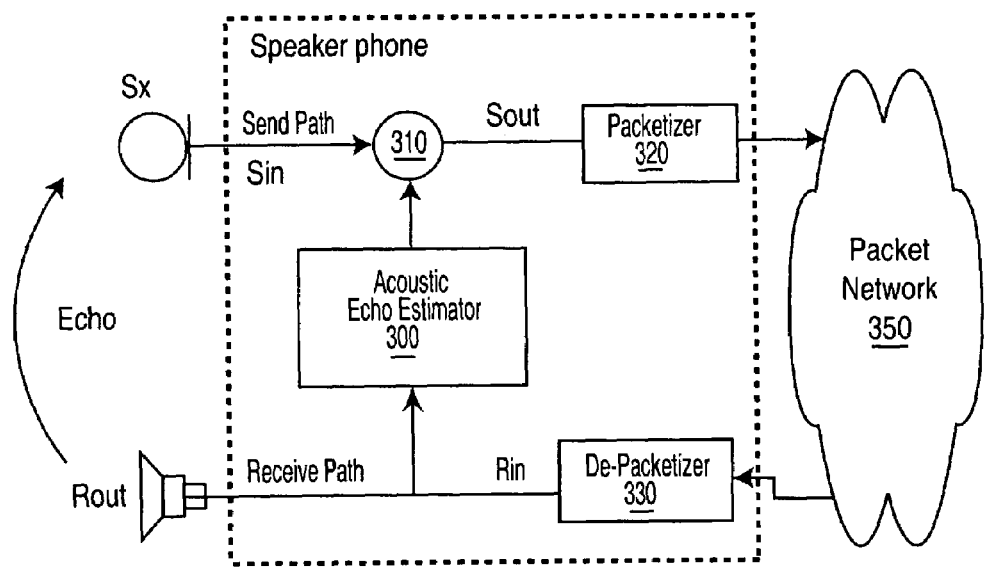
FIG. 3 is a block diagram of a conventional packet network based acoustic echo canceller for connection on with a packet network.
Figure 4:
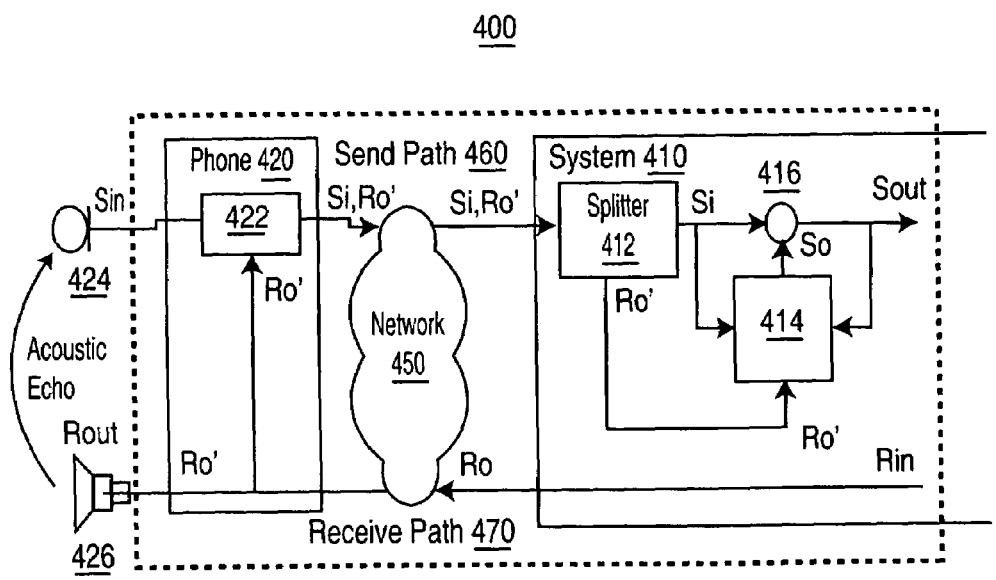
FIG. 4 is a block diagram of a distributed acoustic echo canceller in accordance with one embodiment of the present invention.

Referring to FIG. 4, there is shown a block diagram of a distributed acoustic echo canceller 400 in accordance with one embodiment of the present invention. The distributed acoustic echo canceller 400 comprises a system 410 with a splitter 412, an acoustic echo estimator and control 414 and a subtractor 416; a phone device 420 with a signal combiner 422, a microphone 424, and a loudspeaker 426. The acoustic echo estimator and control 414 will be understood by a person of ordinary skill in the art to be an adaptive filter (see for example "Adaptive Filter Theory", $3^{rd}$ edition. Simon Haykin, Prentice Hall, 1996. ISBN 0-13-322-760-X.

The system 410, such as a PBX, sends a first reference signal Ro to the phone device 420. The first reference signal Ro is delayed and potentially corrupted by a network 450 (such as packet loss/frame erasure compensation/vocoding/delay jitter) when it arrives at the phone device 420 as a second reference signal Ro'. The second reference signal Ro' is sent to the loudspeaker 426 of the phone device 420. Due to acoustic coupling, a first signal Si (equivalent to Sin), comprising a near end signal (such as a voice signal) and an acoustic echo signal, is picked up at the microphone 424. This first signal Si, in conjunction with the transmitted signal Ro', is sent back to the system 410:

At the system 410, the splitter 412 splits the combined signal Si, Ro' and the second reference signal Ro' is used as a reference signal in the acoustic echo estimator and control 414, resulting in echo cancelled signal So. The splitter 412 further monitors the incoming signal (Si, Ro') for lost packets and other corruption, and controls the acoustic echo estimator and control 414 accordingly.

Where the phone device 412 further comprises a compression device (not shown), the combined signal is also decompressed in the splitter 412 as the acoustic echo estimator and control 414 operates on uncompressed samples. Some speech vocoders, such as for example G.729, have their own packet loss compensation/frame erasure schemes. Thus, if there is packet loss in send path 460, any adaptation of the acoustic echo estimator and control 414 is frozen to prevent divergence of the distributed echo canceller 400 in packet loss situations.

The distributed echo canceller 400 is thus not affected by any network delays as the second reference signal Ro' (and not Ro) is used as the reference signal. Furthermore, non-linear effects in receive path 470 such as packet loss are not relevant as there is an exact copy of the second reference signal Ro', after network effects, that is sent to the loudspeaker 426. Packet loss in the send path 460 (Si+Ro') is determined by the protocol of the network 450. Consequently, this echo cancelling structure is not dependent on network delay and can be made more robust with regard to packet loss/frame erasure.

Signal corruption over the send path is handled by the network protocol (i.e. packet loss indication). Adaptation of the echo canceller on lost packets is compensated by a packet loss/frame erasure compensation scheme. An example of such a scheme for PCM voice is as follows:

Begin:
   IF no packet loss (normal operation)
      Adapt and cancel echo using Si and Ro'
   ELSE (packet loss)
      Activate packet loss compensation on So and Ro'.
      Stop adaptation for duration of packet loss
      Stop canceling for duration of packet loss
End Several packet loss schemes are known in the art, such as zero insertion, repeat of previous packet, noise insertion etc. One example of such a scheme applied to echo canceling is Canadian Patent Application No. 2331228 entitled "PACKET LOSS COMPENSATION METHOD USING INJECTION OF SPECTRALLY SHAPED NOISE" by Goubran, Schulz et al.

Figure 5:
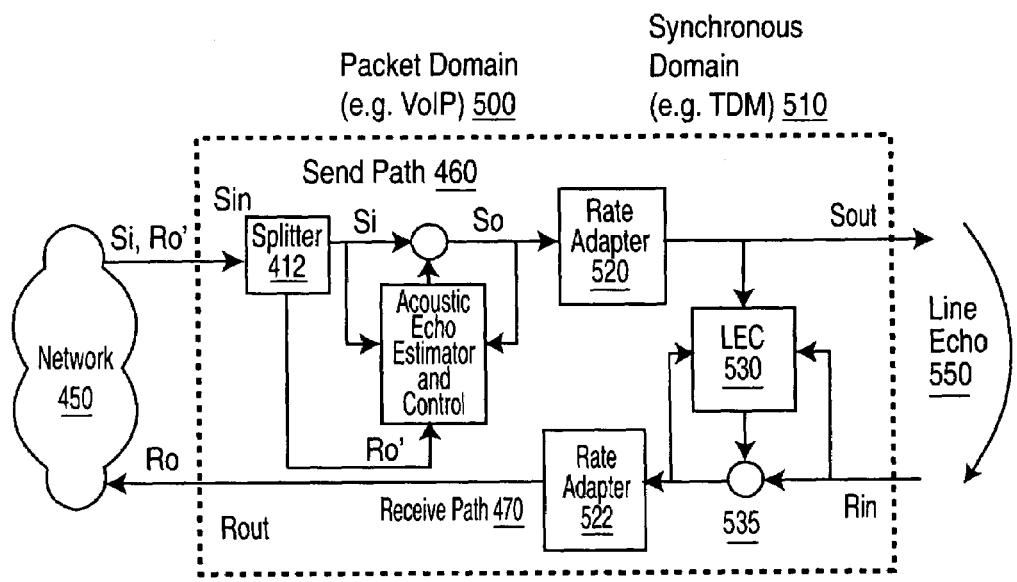
FIG. 5 is a block diagram of the distributed acoustic echo canceller of FIG. 4 (a Full Duplex Handsfree (FDHF) structure) in a packet domain, interfacing to a synchronous domain.

Referring to FIG. 5, there is shown a block diagram of the distributed acoustic echo canceller 400 of FIG. 4 (a Full Duplex Handsfree (FDHF) structure) in a packet domain 500 interfacing to a synchronous domain 510. The packet domain 500 includes voice over IP (VoIP) networks. The synchronous domain 510 includes time division multiplexed (TDM) networks such as the PSTN. The phone device 420 (phone side) is as shown in FIG. 4. Rate adapters 520, 522 are required to interface the packet domain 500 with the synchronous domain 510. The rate adapter 522 in the receive path may also contain a speech compression unit, if speech compression is required. A line echo canceller (530 and 535) is used in the synchronous domain 510 to cancel line echo 550.

Figure 6:
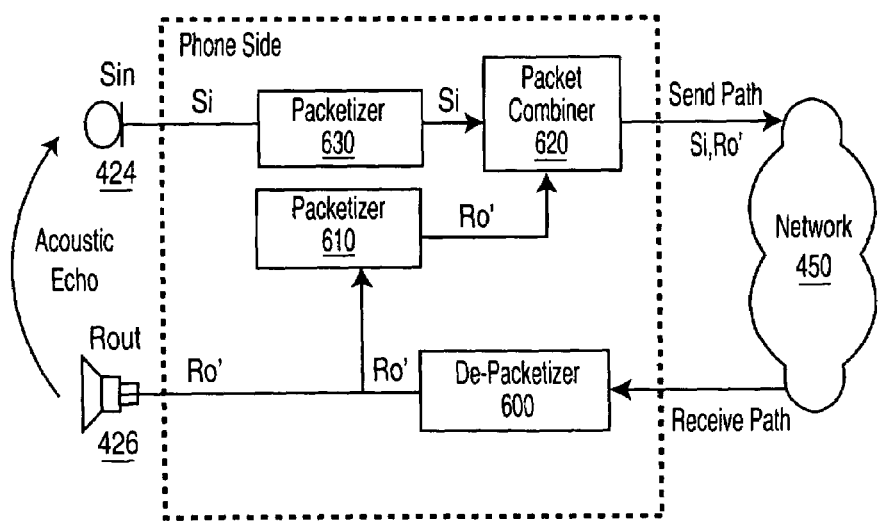
FIG. 6 is a block diagram of a more detailed view of the phone side of FIG. 5 in the packet domain.

Referring to FIG. 6, there is shown a block diagram of a more detailed view of the phone side of FIG. 5 in the packet domain 500 such as a VoIP (Voice-Over-IP) network. A de-packetizer 600 converts packet data into the second reference signal Ro' that is sent to the loudspeaker 426. The de-packetizer 600 compensates for network effects such as lost packets/frame erasure and clock drift (sampling rate adjustment). As a result of these network effects, received packets may be corrupted and are consequently indicated by the second reference signal Ro'. Packetizer 610 converts the second reference signal Ro' sent to the loudspeaker 426 back into packet data for a packet combiner 620. Packetizer 630 packetizes the signal Si received from the microphone 424. Both packets are then combined by the packet combiner 620 and sent over the network 450. The packetizers 610, 630 respectively digitize the signal Si and the second reference signal Ro' (synchronous voice streams) into packets.

It will be understood by those skilled in the art that voice decompression may be performed by the de-packetizer 600 and voice compression by the packetizers 610, 630. Examples of voice compression standards are the International Telecommunication Union (ITU) standards G.711, G.729, and G.732.1.

Figure 7:
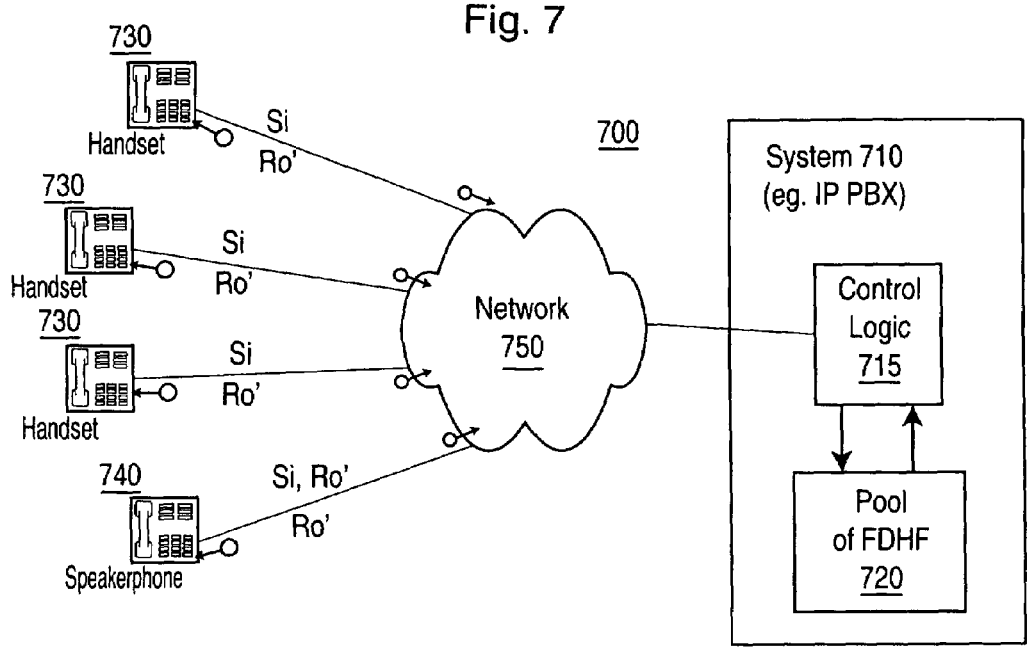
FIG. 7 is a block diagram of a telephone system with a distributed echo cancelling architecture.

Referring to FIG. 7, there is shown a block diagram of a telephone system 700 with a distributed echo cancelling architecture. The telephone system 700 comprises a system 710 having control logic 715 for controlling a pool of Full Duplex Handsfree (FDHF) echo cancellers 720; and a plurality of phone devices 730, 740 connected to the switch 710 over a network 750. One such phone device 740 is shown in a speakerphone mode. The switch 710 is, for example, an IP PBX switch.

In this telephone system 700, by default all of the phone devices 730, 740 are in handset mode where a user uses a handset, and not a loudspeaker, to converse. In the handset mode, no speakerphone resources, such as acoustic echo cancelling, are needed.

When the user hits a speakerphone key, the phone device 740 is put into speakerphone mode as shown in FIG. 7. In the speakerphone mode, a combined signal Si, Ro', which comprises a received reference signal Ro' and a microphone signal Si, is sent back to the switch 710 over the network 750. At the switch 710, a speakerphone resource is allocated out of the pool of FDHF 720 to perform echo cancelling functions on the combined signal Si, Ro'.

As the number of active speakerphone calls is generally much less than the number of phone devices attached to a telephone system, the speakerphone resources of the telephone system 700 are shared among the users. Thus, a cost reduction is achieved. Furthermore, the speakerphone echo cancelling resources at the switch may be of a higher quality than echo cancelling resources at each device as the cost is mitigated over more than one user.

Figure 8:
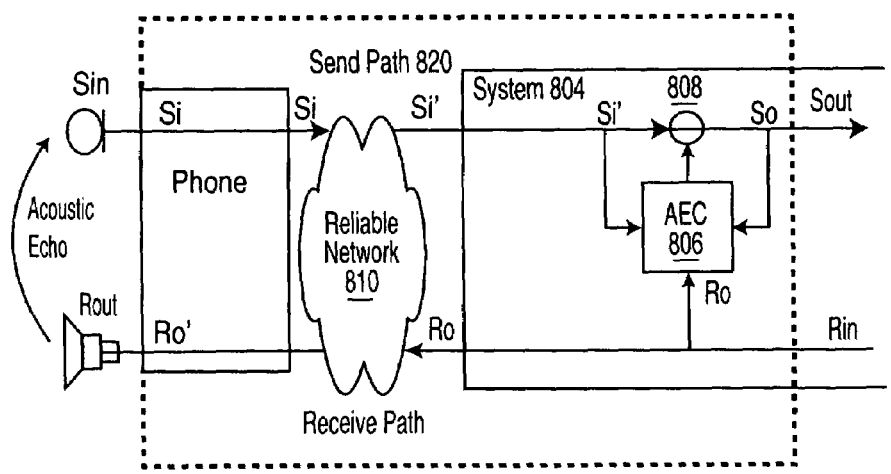
FIG. 8 is a block diagram of a distributed echo canceller operating over a reliable network.

Referring to FIG. 8, there is shown a block diagram of a distributed echo canceller 800 operating over a reliable network 810. The distributed echo canceller 800 comprises a phone device 802, and a system 804 with a subtractor 808 and an acoustic echo estimator and control (AEC) 806. The reliable network 810 is, for example, a TDM connection.

When the network 810 is reliable and the delay is deterministic, reference signal Ro' is a delayed version of a reference signal Ro. Thus, it is not necessary to send the reference signal Ro' back over send path 820, especially when the network delay is short. Instead of the reference signal Ro', the acoustic estimator and control 806 uses the reference signal Ro.

Figure 9:
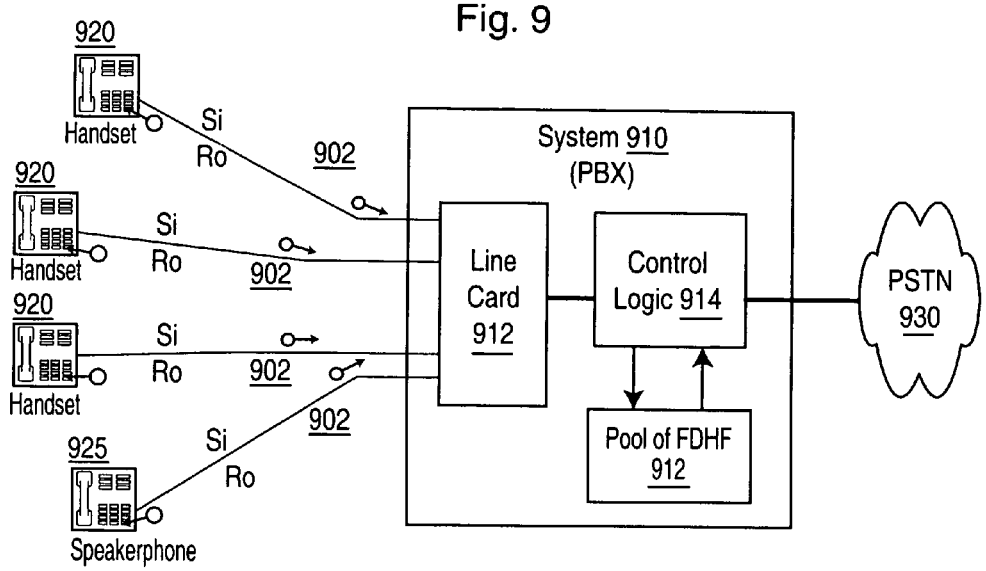
FIG. 9 is a block diagram of a TDM based telephone system with the distributed echo canceller of FIG. 8.

Referring to FIG. 9, there is shown a block diagram of a TDM based telephone system 900 with the distributed echo canceller of FIG. 8. The TDM based telephone system 900 comprises a plurality of phone devices 920, 925 connected over land lines 902 (a reliable network) to a system 910. The system 910 comprises line card 912 for interfacing the land lines 902 with control logic 914, the control logic 914 interfacing with the PSTN 930 and controlling a pool of Full Duplex Handsfree (FDHF) echo cancellers 916. The TDM based telephone system 900 operates in a similar manner to the telephone system 700 of FIG. 7 where a FDHF is allocated from the pool of FDHF 916 for a phone device 925 in speakerphone mode. Thus, the distributed echo cancelling architecture can also be used to share echo cancelling resources even over reliable networks.

In VoIP (Voice-Over-IP) networks, line echo cancellers are typically located in gateways connecting the VoIP networks to traditional networks, such as PSTN, with analogue POTS phones. Echo cancelling is required, as echoes become more noticeable to the user when transmission delays introduced by a network increases. These perceived echoes considerably degrade speech quality.

Figure 10:
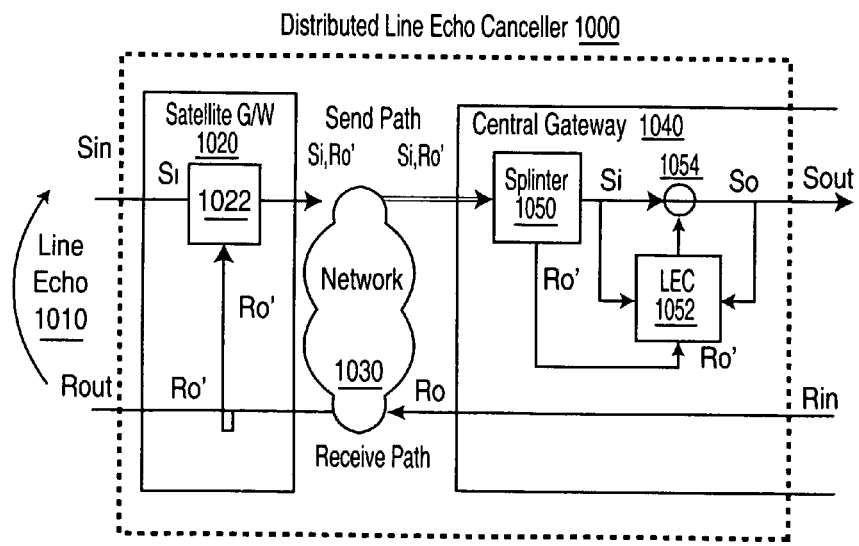
FIG. 10 is a block diagram of a packet based distributed Line Echo Canceller to compensate for line echo.

Referring to FIG. 10, there is shown a block diagram of a packet based distributed Line Echo Canceller 1000 to compensate for line echo 1010. The packet based distributed Line Echo Canceller 1000 comprises a satellite gateway 1020 connected over a packet network 1030 to a central gateway 1040. The line echo canceller 1000 works in a similar manner as the acoustic echo canceller shown in FIGS. 4, 5, and 6. The near end signal is corrupted by a line echo 1010. The satellite gateway 1020 combines the signal Si with the reference signal Ro', which is then transmitted to the central gateway 1040. At the central gateway 1040, a splitter 1050, in combination with a subtractor 1054 and a line echo estimator and control (LEC) 1052, perform echo cancelling.

Figure 11:
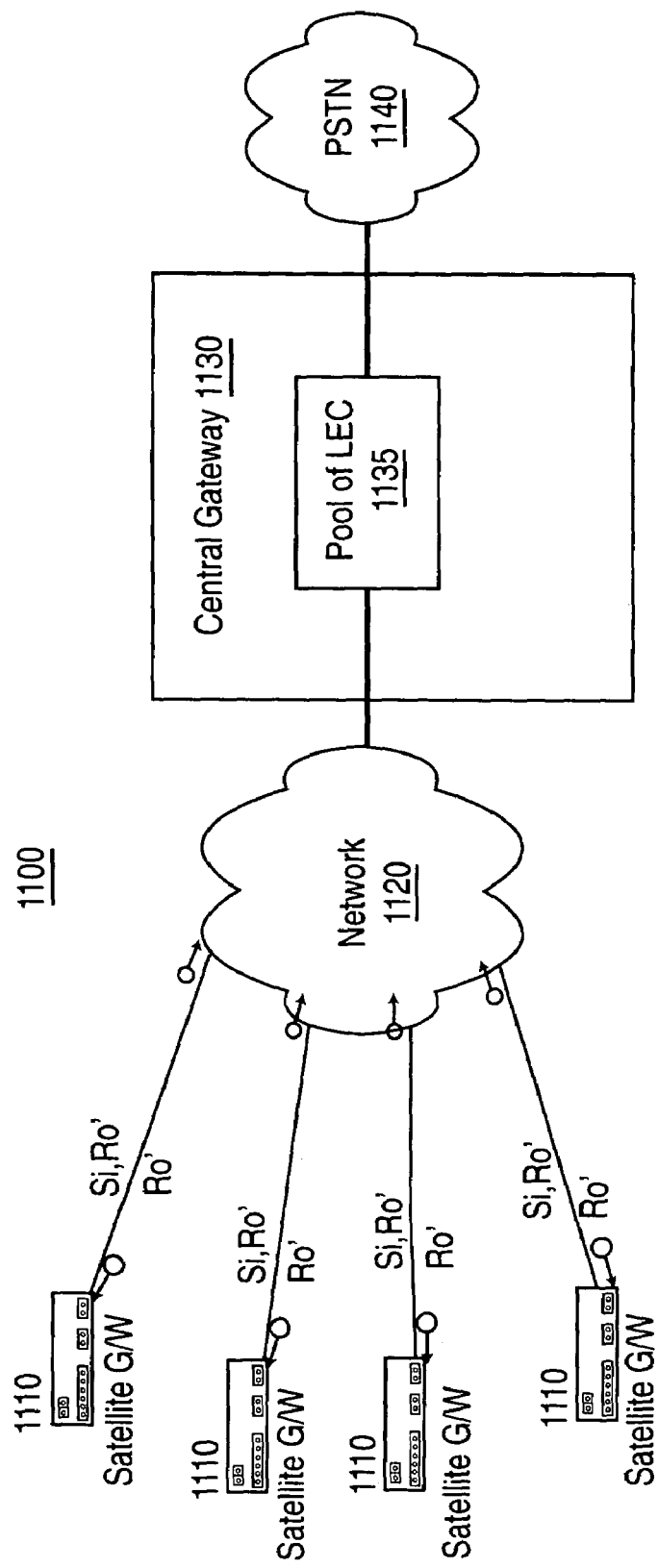
FIG. 11 is a block diagram of a VoIP network using distributed line echo cancellers of FIG. 10.

Referring to FIG. 11, there is shown a block diagram of a VoIP network 1100 using distributed line echo cancellers of FIG. 10. The VoIP network 1100 comprises a plurality of satellite gateways 1110 connected over a packet network 1120 to a central gateway 1130 which interfaces with the PSTN 1140. The central gateway 1130 has a pool of distributed line echo cancellers 1135 (of FIG. 10) for line echo cancelling. The central gateway 1130 interfaces the VoIP network 1100 to traditional synchronous networks such as the PSTN 1140 or, alternatively, telephones.

Typically the satellite gateways require costly echo cancelling resources to cancel the line echoes before they enter the packet domain. With distributed echo cancelling, however, this function can be distributed between the satellite gateways and the central gateway. The present invention has the advantage of having the actual line echo cancelling resources located at the central gateway, which is typically more cost tolerant.

Although preferred embodiments of the invention have been described herein, it will be understood by those skilled in the art that variations may be made thereto without departing from the scope of the invention or the appended claims.

What is claimed is:

1. A distributed echo canceller, comprising:
   a system for applying a signal (Ro) to a network, and for receiving a signal (Si, Ro') from said network, splitting said signal (Si, Ro') into signals (Si) and (Ro'), the signal (Ro') being a modified version of the signal (Ro) and the signal (Si) containing an echo of said modified signal (Ro'), and canceling echoes from said signal (Si) using the modified version (Ro') of said signal (Ro); and
   at least one device that is remote from the system over said network for (i) receiving and outputting said modified version (Ro') of the signal (Ro) corrupted by transmission over the network, (ii) receiving a signal (Si) containing an echo of to said modified signal (Ro'), and (iii) combining and transmitting said signals (Si, Ro') over the network to said system for echo cancellation of said signal (Si) using said modified signal (Ro').

2. The distributed echo canceller of claim 1, wherein the system further comprises a splitter, a subtractor, and an echo estimator and control.

3. The distributed echo canceller of claim 2, wherein said at least one device is a handsfree device.

4. A method of distributed echo cancelling, comprising
   transmitting a first reference signal from a system to a network;
   receiving a second reference signal by at least one device that is remote from said system over said network, wherein the second reference signal comprises the first reference signal as modified by network effects due to transmission over the network;
   outputting said second reference signal from said at least one device;
   receiving within said at least one device a further signal containing an echo of said second reference signal;
   combining said further signal and said second reference signal at said at least one device;
   transmitting said combined signal from said at least one device to said network;
   receiving within said system the combined signal;
   splitting said second reference signal from said further signal; and
   canceling the echoes from said further signal using the second reference signal.

* * * * *